(12) United States Patent
Stepps et al.

(10) Patent No.: US 7,760,107 B1
(45) Date of Patent: Jul. 20, 2010

(54) METHOD FOR PROGRAMMING A NETWORK OF CONTROL POINTS

(75) Inventors: Dale B. Stepps, Mountain Ranch, CA (US); Daryl Soderman, Fort Lauderdale, FL (US)

(73) Assignee: Inteltech Corporation, Fort Lauderdale, FL (US)

( * ) Notice: Subject to any disclaimer, the term of this patent is extended or adjusted under 35 U.S.C. 154(b) by 353 days.

(21) Appl. No.: 11/977,260

(22) Filed: Oct. 24, 2007

(51) Int. Cl.
*G08B 5/22* (2006.01)
*H05B 39/00* (2006.01)

(52) U.S. Cl. .............................. 340/815.45; 340/815.4; 340/332; 362/800; 315/131

(58) Field of Classification Search ............ 340/815.45, 340/332
See application file for complete search history.

(56) References Cited

U.S. PATENT DOCUMENTS 6,160,359 A * 12/2000 Fleischmann ............... 315/294
6,608,617 B2 * 8/2003 Hoffknecht et al. ......... 345/173
7,348,736 B2 * 3/2008 Piepgras et al. ............. 315/291

* cited by examiner

*Primary Examiner*—Donnie L Crosland
(74) *Attorney, Agent, or Firm*—Malloy & Malloy, P.A.

(57) ABSTRACT

A system and method for variably programming a plurality of utilitarian devices such as, but not limited to, LED light assemblies, motions detectors, etc. which may be associated with each of a plurality of control points. The control points are electrically interconnected to one another and to a power source to define a network, wherein an identifying code is assigned to each of the control points. One or more control facilities in the form of touch pads are cooperatively structured with a master control for programmed operations of separate predetermined numbers or arrays of said plurality of control points and the one or more utilitarian devices associated with each control point.

15 Claims, 3 Drawing Sheets

METHOD FOR PROGRAMMING A NETWORK OF CONTROL POINTS

BACKGROUND OF THE INVENTION

1. Field of the Invention

This invention is directed to a system and method for programming a plurality of utilitarian devices installed in a domestic, commercial or other appropriate environment, wherein each utilitarian device is operatively associated with one of a plurality of control points and further wherein the plurality of utilitarian devices may include LED light assemblies, motion detectors or other devices. The plurality of control points are interconnected into a networked array, assigned an identifying code and selectively programmed, such that predetermined ones of the control points and associated devices operate through manipulation of a control facility preferably in the form of one or more touch pads.

2. Description of the Related Art

In recent years, significant advancements have been made in lighting technology and in particular, the use of light emitting diode (LED) based lighting systems. Further, such technologies involve "networked lighting systems" which allow a variety of illuminating conditions to be created throughout a given physical area. As such, the versatility of such networked lighting facilities can be used in expansive, commercial facilities or in more restricted domestic environments.

A particular advantage associated with lighting networks is the ability to control or "program" individual ones of the lighting assemblies defining the network or a predetermined number of such lighting assemblies to accomplish selective, variable but easily controllable illumination and lighting effects throughout the given area. Depending on the physical characteristics of the area being illuminated, the establishment of known or conventional lighting networks may be relatively complicated in addition to the problems associated with the actual programming procedure utilized for the associated system. Conventional programming techniques typically involve determining the setting and/or location of each light fixture or assembly in a designated lighting network and subsequently determining a set-up and corresponding element on a lighting board or computer.

More specifically, when a network has been established the actual programming is typically done by a trained technician utilizing an appropriately configured computer, processor or terminal interface. However, if the lighting network is to be installed in a residential application by an untrained electrical contractor, the use of an appropriate computer or processor may not be available and the one or more individuals accomplishing the programming may not be adequately trained. Additional problems associated with the operational control as well as the programming of networked lighting systems may relate to the interconnection of the plurality of light assemblies through appropriate electrical conductors. Such interconnection should be accomplished in a manner which further facilitates or enhances the ability to easily establish a variable, programmed operation of individual ones or a designated plurality of light assemblies defining the lighting network.

Accordingly, network lighting control, as well as the programming technique associated therewith, while becoming increasingly popular, does include certain disadvantages and problems primarily associated with the programming facilities, instrumentation required to accomplish accurate programming as well as the availability trained personnel. Further, in performing the programming techniques as conventionally known, control signals for lighting systems are generally generated through the established network through the various lighting assemblies. However, in order to accomplish this, the lighting network must involve the establishment of information pertaining to each lighting assembly which is communicated, through the network and other control features associated therewith. As such, the task of programming, separate and apart from the physical installation and power interconnection of the light assemblies associated with an established network may take many hours, depending on a specific application.

Therefore, there is a need in this industry for an improved system and/or method for programming a plurality of devices specifically including, but not limited to, LED or other appropriate light assemblies. Moreover, such an improved proposed system and/or method should be capable of accurately and efficiently programming a plurality of devices, other than lighting assemblies. Such devices may include, but not be limited to motion detectors, fan drives, irrigation valves, gate structures, etc. Further an improved system and method of programming should also facilitate operative control of more than one device, such as a combination of light assembly and motion detector operatively associated with a single "control point", wherein a plurality of such control points are electrically interconnected to one another and to an adequate power source to define the network being programmed. Finally, a proposed system and method to efficiently accomplish programming of a given network, would preferably involve a minimum number of personnel which do not have to be extensively trained, wherein the programming is physically accomplished utilizing the equipment associated with its operation such as one or more touch pads or like control facilities.

SUMMARY OF THE INVENTION

The present invention is directed to a system and method which overcomes many of the well recognized disadvantages and problems associated with programming an established network of interconnected light assemblies or other utilitarian devices such as, but not limited to motion detectors, gates, garage doors, irrigation valves and a variety of other devices. Moreover, description of the system and method for programming such networks specifically relates to the network comprising a plurality of "control points" wherein each control points is operatively associated with at least one of the aforementioned utilitarian devices such as an LED lighting assembly.

Alternatively and as set forth in greater detail hereinafter, each of the control points in an established network may be operatively associated with more than one utilitarian device such as an LED light assembly, as set forth above, as well as a motion detector. The versatility of the system and method of the present invention allows for the efficient programming in a manner which provides for the concurrent operation of both utilitarian devices associated with each control point or alternatively the independent operation of the two devices associated with the same control point. In an exemplary application as described herein and further by way of example, each control point may include an LED light assembly as well as a motion detector. Accordingly, the programming technique associated with the present invention will facilitate the concurrent activation of both the light assembly and motion detector associated with the same control point. However, the operative control of any or all of the control points may be such that the motion detector may be activated independently of the light assembly associated with the same control point or vice versa.

Accordingly, the network preferably comprises a predetermined number of control points, wherein each control point may be associated with a first device, such as an LED light assembly or a first and second device such as an LED light assembly and a motion detector. In certain applications having more expansive areas, a plurality of such networks may be required, wherein each network may be operatively interconnected through the provision of master control assembly which may be interconnected together by a motherboard or other facility thereby allowing communication between the networks through interaction of the independently associated master control assemblies. Other structural and operative features associated with a single network include at least one, but in many instances, a plurality of control facilities each being in the form of a touch pad. As should be apparent the operation of a network of lighting assemblies may preferably include a plurality of such control facilities or touch pads such that the lighting assemblies associated therewith may be activated or operated from different points throughout the networked, illuminated area.

Once the location of the network has been established, the control points of the network are interconnected to one another and to a power source. The programming system and method of the present invention can then be applied. As set forth above, it is assumed that the network also includes at least one of the aforementioned control facilities or touch pads and/or more practically a plurality of such touch pads. Further, each of the touch pads includes a plurality of control members which may be diverse in their structure and operation. In at least one preferred embodiment of the present invention, the control members of each of the one or more touch pads comprises a plurality of touch pad buttons as well as a touch slider member. In a more specific structural installation and modification each touch pad, defining the aforementioned control facility, includes a plurality of five touch pad buttons and at least one slider member.

In addition, the aforementioned master control facility is interconnected so as to be operatively associated with the one or more touch pads. Prior to performing the programming techniques associated with the present invention each of the plurality of control points is assigned an identifying code, whereby each control point as well as the one or more utilitarian devices associated therewith may be independently recognized, such as by the master control assembly, thereby further facilitating the selective programming of each of the plurality of control points and associated utilitarian devices.

Programming of the network of control points may be accomplished by designating a first one of the control members, such as one of the touch pad buttons on the touch pad, to control a first predetermined number of control points as well as the devices associated therewith. The assignment of one or more of the control points to a specific touch pad button is accomplished by manipulating the plurality of control members, including both touch pad buttons and slider member in a predetermined sequence to establish, by way of example, the first predetermined number of control points to be operated by the first designated touch pad button. Subsequently, a second control member or touch pad button may be designated to control a second predetermined number of control points, as well as the utilitarian devices associated therewith. As such, the second predetermined number of control points is determined to be operated by the second control member or touch pad button by similarly manipulating the plurality of control members, including both the touch pad buttons and the slider member in a predetermined sequence to establish that the second predetermined number of control points are to be operated by the second touch pad button.

When each of the plurality of control points is operatively associated with only one utilitarian device, such as an LED light assembly, it may be preferable to prohibit the inclusion of a previously programmed control point and/or LED lighting assembly to be operated other than by one of the touch pad buttons. However, in at least one preferred embodiment of the present invention the same utilitarian device can be programmed to be a part of more than one grouping or predetermined number of control points. This can be accomplished by combining groups to predetermined numbers of control points together where some have already been programmed. Another alternative comprises including additional control members with a given control facility which serves to operate different or separate groupings of control points, at least some of which have been previously programmed.

Accordingly, the provision of the master control facility includes recognizing capabilities which serves to recognize the identifying codes associated with each of the plurality of control points. In actual practice, each of the control points, during the programming procedure, is sequentially accessed and successively recognized by virtue of the recognizing capabilities of the master control assembly. Moreover, in at least one embodiment of the present invention, when a control point has been previously programmed the master control facility will recognize such pre-programming, through the memorizing of the identifying code associated therewith and bypass the control point because it has been previously programmed. The remaining control points of the network will then be sequentially accessed until a control point is recognized as having not yet been programmed. That control point and the utilitarian device associated therewith may then be programmed to be operated by a different touch pad button or control member. However, as set forth above the recognizing capabilities of the master control is structured to include sufficient versatility to overcome the recognition of a previously programmed control point. As such, the preprogrammed control point, either individually or as part of a preprogrammed grouping, will be allowed to be programmed into an additional grouping or predetermined number of control points.

Additional structural and operative features associated with the present invention include the entering or establishment of a program mode in situations where each of the plurality of the control points of the network is operatively associated with more than one utilitarian device. Further by way of example and as generally set forth above both a first device, such as an LED lighting assembly, and a second device, such as a motion detector may be operatively associated with each of the control points in a given network. As such, a first programming of the lighting assemblies is accomplished by manipulating the control members in a predetermined sequence. However, first a predetermined program mode may be entered into the control facility or touch pad to establish that only the plurality of LED lighting assemblies of the network are to be programmed, independently of the motion detector associated with each of the control points. The subsequent programming of the plurality of motion detectors is accomplished independently of the programming of the light assemblies by entering or establishing a second program mode which provides that only the motion detectors are to be programmed for selective operation by the plurality of control members or touch pad buttons associated with each control facility or touch pad.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As represented in the accompanying Figures, the present invention is directed to a system and method for programming a network generally indicated as 10 comprised of a plurality of utilitarian devices such as, but not limited to a plurality of LED light assemblies, motion detectors, etc. In further defining the structural and operative features of the present invention, the network 10 further includes at least one but more practically a plurality of control assemblies in the form of touch pads generally indicated as 12 located throughout the physical area associated with the network 10, as clearly represented in FIG. 1.

Figure 2:
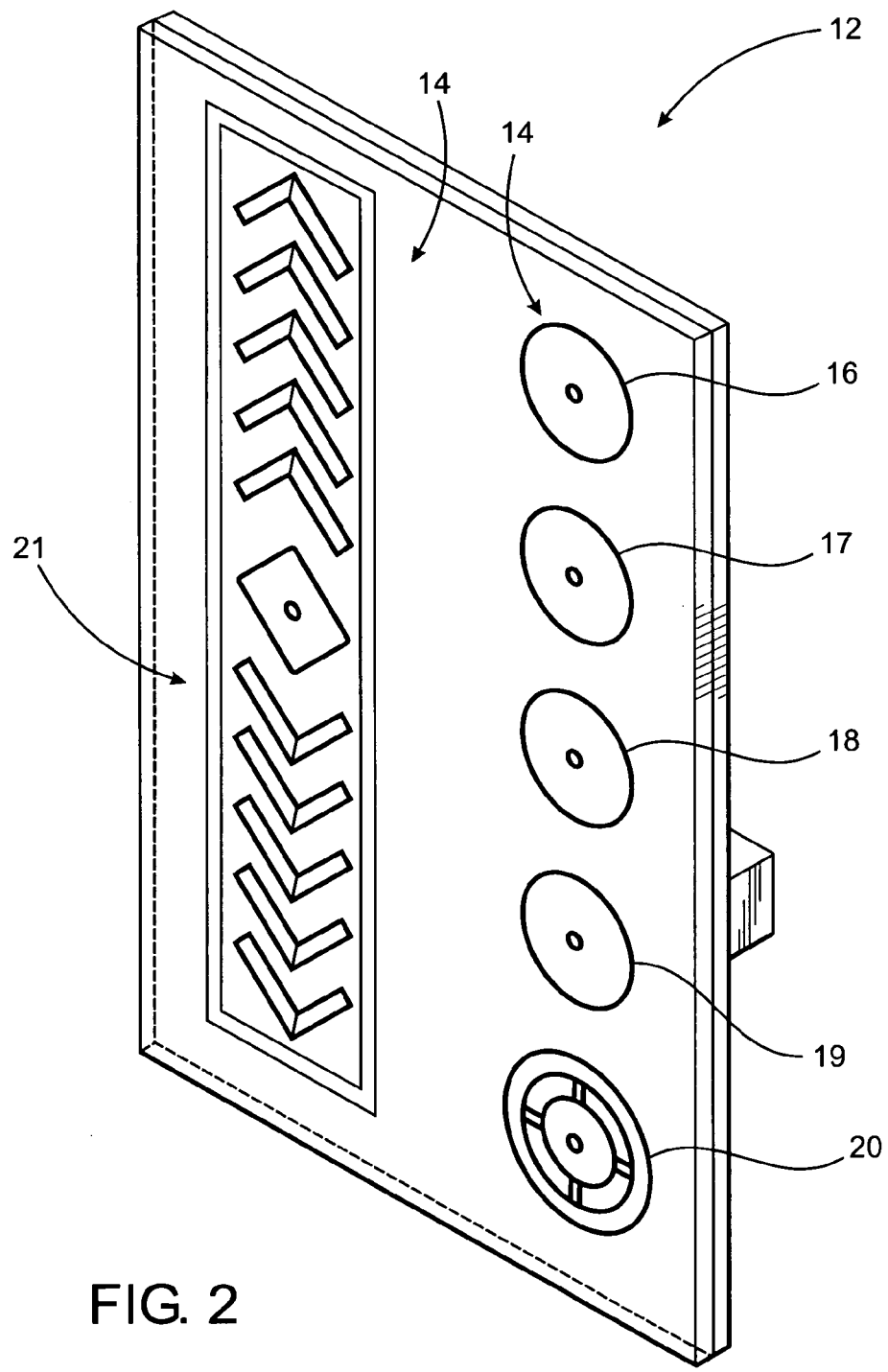
FIG. 2 is a detailed perspective view of a control facility in the form of a touch pad including a plurality of control members associated therewith.

FIG. 2 discloses structural and operative details of each of the plurality of control facilities or touch pads 12, wherein each touch pad may include a plurality of control members collectively and generally represented as 14. Further, the plurality of control members 14 preferably include diverse structures and functions but are cooperatively associated so as to work in consort with one another to accomplish the programming system and method of the present invention. Moreover, the plurality of control members 14 include a plurality of touch pad buttons 16 through 20 and at least one linear slider member 21.

Figure 1:
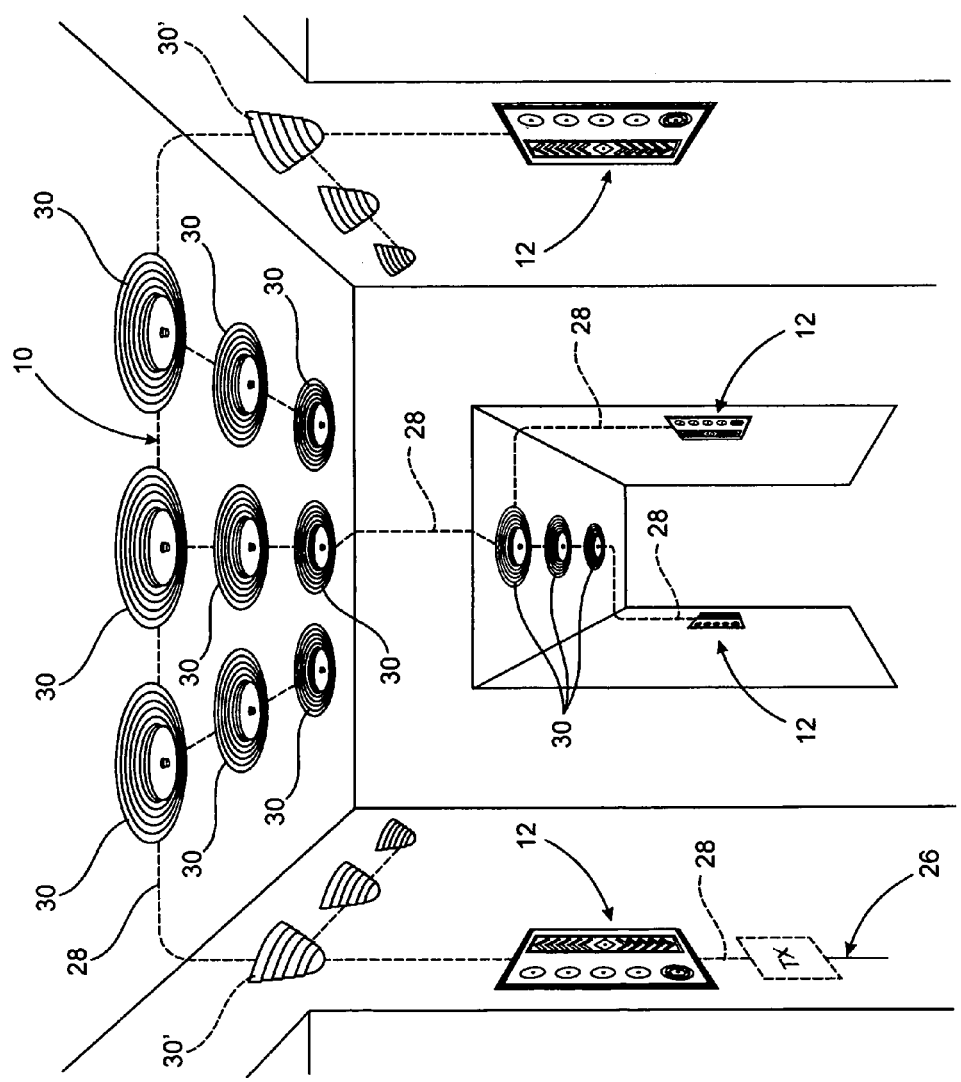
FIG. 1 is a perspective view of a representative network capable of being programmed utilizing the system and method of the present invention.
Figures 3, 3A, 3B:
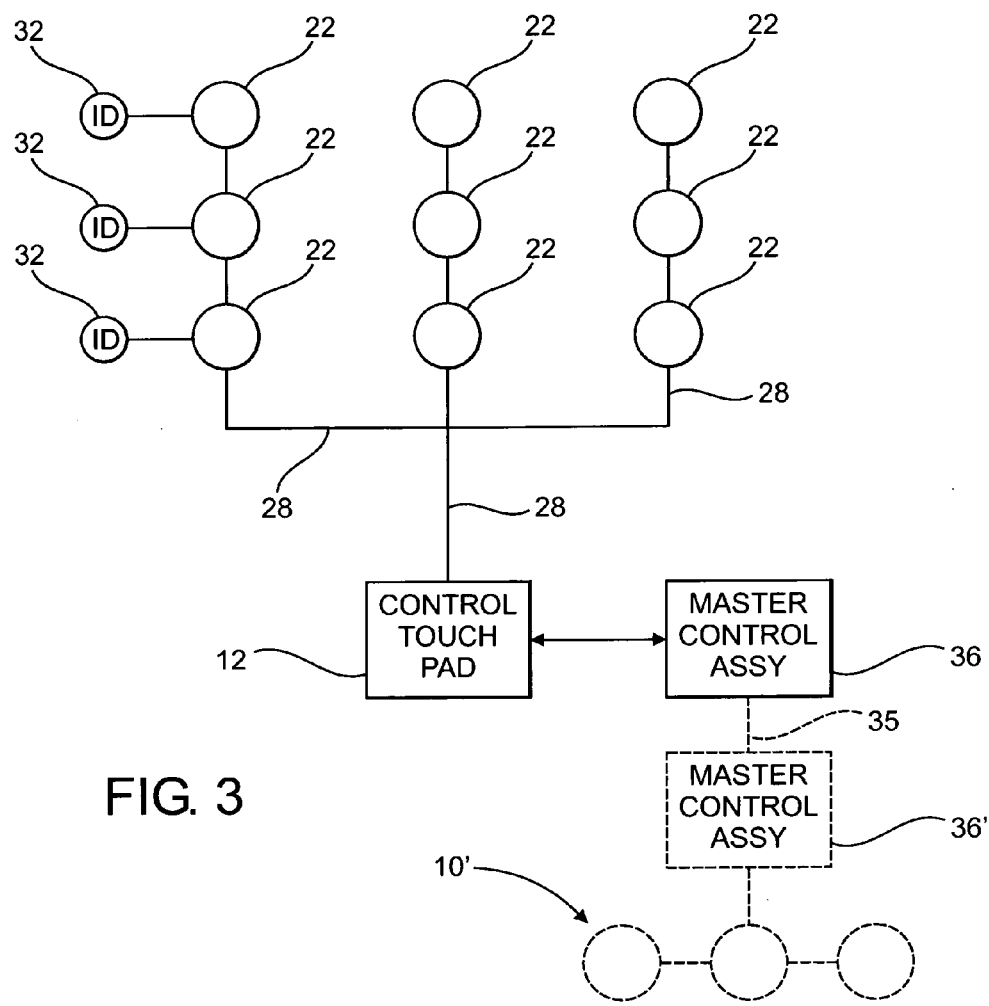
FIG. 3 is a schematic representation in block diagram form of the various operative and structural features incorporated within the system and method of the present invention.
FIG. 3A is a schematic representation of one of a plurality of control points and an associated first utilitarian device of the type incorporated in the network as represented in FIG. 3.
FIG. 3B is a schematic representation of one of a plurality of control points operatively associated with different first and second utilitarian devices of the type which may be incorporated in the network as represented in FIG. 3.

With primary reference to FIGS. 1 and 3, the network 10 comprises a plurality of control points 22 electrically interconnected in accordance with appropriate circuit connections and further interconnected to the one or plurality of control facilities or touch pads 12. In addition, the network 10 including the plurality of control points 22 are interconnected to an appropriate power source by an electrical input line as at 26 and 28. By way of example, the input line 26 may be a conventional 120 volt alternating current input line and wherein the input line 28 may be low voltage wiring. The low voltage wiring 28 may further extend throughout the network 10 for interconnecting the various control points 22 as represented in both FIGS. 1 and 3.

Another structural and operative feature of the network 10 which further facilitates the efficiency of the system and method of the present invention is the operative association of each of the control points 22 with one or more utilitarian devices. With primary reference to FIGS. 3A and 3B, one preferred embodiment of the present invention includes each of the control points 22 associated with a first utilitarian device 23 such as defined by an LED light assembly. Yet another preferred embodiment comprises each of the control points, as at 22' in FIG. 3B operatively associated with a first utilitarian device, such as LED lighting assembly 23 as well as a second utilitarian device such as, a motion detector 25. For purposes of further descriptive clarity, the schematic representation of the network 10 as represented in FIG. 1 demonstrates each of the control points 22 being in the form of an LED light assembly as represented by appropriate lighting fixtures 30. As also represented the lighting fixtures 30 may vary in style, placement and/or structure depending on their use, position, application as well as the physical characteristics of the area throughout which the network 10 extends. Accordingly, the variations in the light fixtures 30 and 30' are represented. It is emphasized that FIG. 1 is a schematic representation and as such the control points 22 operatively associated with the light fixtures 30 and 30' are represented in FIG. 3. It is also to be understood that each of the control points 22 may be associated with a first utilitarian device 23 and/or a first, second and additional utilitarian devices as at 23 and 25 in FIG. 3B.

Yet additional structural and operative features associated with the system and method for programming the plurality of control points 22, as well as the one or more utilitarian devices 23 and 25 associated therewith, include the assignment of an identifying code 32 to each of the plurality of control points 22 as partially and schematically represented in FIG. 3. The identifying code 32 serves to identify and distinguish each of the control points 22 from one another, which further facilitates the programming thereof in an efficient manner. Moreover, the identifying codes further serve to identify and distinguish the touch pads 12 and the control points 22 associated therewith.

In addition, a master control assembly 36 is interconnected to the network 10 and is cooperatively operational with each of the one or more control facilities or touch pads 12. The master control assembly 36 has recognizing capabilities to recognize each of the individual identifying codes 32 associated with each of the control points 22. Accordingly, the identifying of each of the control points 22 as they are sequentially accessed further facilitates the determination of whether a given control point 22 can be included, into different programmed patterns or arrays for selective operation by the control members 14 associated with the touch pads or control facilities 12.

More specifically, and by way of example, a typical network 10 may comprise thirty-two control points each having a different identifying code (0-31) wherein at least one master control assembly 36 is associated with each of the established networks 10 defined by the thirty-two control points 22. However, a plurality of master control facilities as at 36 and 36' may also be operative to interact with one another, such as being connected together on a motherboard or other facility. As such, communication can occur there between, as at 38, thereby effectively linking additional networks, as at 10 and 10' to one another for collective and/or independent operation. The plurality of networks 10, 10', etc. may be more practical for expansive physical areas such as required in various types of commercial facilities.

Upon completion of installation and set up of the network 10 each of the plurality of identifying codes are assigned to appropriate ones of the control points 22. Further, the identifying codes are "registered" with the master control assembly 36 to facilitate recognition of each of the control points 22 independently of one another. Further description of the system and method of the present invention will be set forth hereinafter by way of an example program which may be conducted utilizing various components defining the network 10 as represented in FIGS. 1-3, as well as 3A and 3B.

More specifically, an installer may instigate programming by manipulating the control members 14 of one of the possible plurality of control facilities or touch pads 12. Even more specifically, to program a first predetermined number of control points 22 as well as the utilitarian devices associated therewith, as at 23, the installer presses at least a first touch pad button, as at 16, that is to be programmed to control a first predetermined number of control points 22 and utilitarian devices or LED's 23 associated therewith. All of the LED light assemblies 23 will then indicate acceptance by generating a single flash and then turn off. The installer then presses the first control member or button 16 being programmed once again. The first predetermined number of control points having the lowest identifying code will be activated and remain in an on condition. To add this control point as well as the LED light assemblies 23 associated therewith, the installer then presses or manipulates the slider member 22 in an upward direction. If the control point 22 having the lowest identifying code is not to be added to the programmed array operated by the first control member or touch pad button 16, the touch pad button 16 is again pressed so as to move to the next control point having the next highest identifying code. In this manner the installer will access each of the control points 22 sequentially having progressively greater identifying codes so as to define or establish a first predetermined number of control points 22 and associated utilitarian devices 23 which are to be controlled by the first control member or touch pad button 16. It is also to be noted that in programming the control points as set forth above, more the one "first button", as at 16 and 19 may be used to control the same first predetermined number or grouping of control points.

In this same manner the installer moves through each of the remaining control touch pad buttons 17 through 20 and performs the same procedure by sequentially accessing, from lowest identifying code to the highest identifying code, each of the control points 22. Each of the control members 16 through 20 (or other appropriate number) are thereby programmed to control a first predetermined number of control points, a second predetermined number of control points, a third predetermined number of control points, etc. The installer then manipulates the slider member 22, such as in a downward direction, to complete each of the program segments associated with each of the touch pad buttons 16 through 20. It is again emphasized that this "done manipulation" could be represented by manipulation of various ones of the control members 14 in any given but predetermined or preselected order.

Another operative feature which facilitates efficient programming is the recognizing capability of the master control assembly 36. More specifically and as set forth above, the master control facility 36 is structured to recognize each of the identifying codes 32 of the control points as they are sequentially accessed during the programming procedure. Further, structuring of the master control assembly 36 is such that upon accessing and recognizing an identifying code 32 of a control point 22 that has already been programmed, the preprogrammed control point 22 will be excluded from being programmed by any other control member or contact button 16 through 20. More specifically, once a given control point 22 has been programmed, such as for operation by touch pad button 16, it will no longer be included in subsequent programmed segments and therefore cannot be operated by the additional control button 17 though 20. This is accomplished by the recognition capabilities of the master control assembly 36 accessing and recognizing the respective identifying codes of the control points 22 as the control points 22 are sequentially accessed.

Subsequent to accomplishing the programming procedure of each of the control points 22 and their associated utilitarian devices 23 and 25, the installer may test the program by further manipulation of the control members 14 and/or independent manipulation or operation of the touch pad buttons 16 through 20. In this manner, the installer programs each of the plurality of touch pads 12 defining the aforementioned control assembly to operate intuitively for wherever they are individually located. However, because of the structuring of the touch pads 12 and the interactive connection thereof with the master control facility 36, it is possible to share operation of a preprogrammed, predetermined number of control points 22 with one or more control members 14 on a different one or a plurality of different control pads 12 without going through the entire programming procedure, as outline above, with each control pad. This is possible because once an individual enters the system into a "program mode" all of the touch pads 12 are activated to be programmed. This is accomplished by making a "shared transfer" of a given predetermined number of control points to one or more additional touch pads 12 before performing the "done manipulation" as set forth above. As with other aspects of the programming procedure, the "shared transfer" may be performed by a predetermined manipulation sequence of the control members 14 associated with the touch pads 12 involved in the "shared transfer" procedure. Once the "shared transfer" of a plurality or grouping of programmed control points 22 has been accomplished, that grouping can be operated by each of the designated control members 14 on each of the different touch pads 12 involved with the "shared transfer".

It will also be possible for areas located or associated with other networks, as at 10', which are served by a different master control assembly 36' to be effectively joined or linked due to the interactive communication of the master control facility 36, 36' etc. This makes the formation of a virtual network having almost any size a viable alternative.

Other features associated with the programming system and method of the present invention is the establishment of one or more programming modes. More specifically, when each of the control points 22 includes a single utilitarian device 23 the first programming mode may be entered so as to identify to the control facility or touch pad 12 as well as the master control assembly 36 that the utilitarian device or LED light assembly 23 is being programmed. However, when each of the control points 22' includes a first device 23 and a second device 25 different program modes may have to be established and entered to identify which of the two utilitarian devices 23 or 25 are then currently being programmed. As with programming a single utilitarian device 23, as represented in FIG. 3A, each of the control points 22' are sequentially accessed from the lowest identifying code 32 to the highest identifying code 32 in order to determine which of the control points 22' are to be included in a given programmed segment by operation by each of the touch pad buttons 16 through 20.

A similar procedure is involved with programming the second utilitarian device or motion detector 25 which includes the sequential accessing and recognizing of each of the identifying codes 32 associated with each of the control points 22'. However, when programming the second utilitarian device 25, a second program mode must be established to inform the master control assembly 36, in cooperation with the control facility or touch pad 12, that programming technique, as set forth above, occurs with specific reference to the control points 22' and the controlled and programmed operation of the second utilitarian device 25 which, as set forth above, may be a motion detector.

Further, the master control assembly 36 cooperates with the touch pad 12 in the structuring of the control points 22' so that each of the utilitarian devices 23 and 25 may be operated concurrently, such as when the LED light assembly 23 and the motion detector 25 are concurrently activated. In contrast, each of the utilitarian devices 23 and 25 may be activated and operated independently such as, but not limited to, when the LED light assemblies 23 and/or motion detectors 25 are operated and activated without the activation of the other utilitarian device 23 and 25.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A method of programming a plurality of utilitarian devices for selective operation, said method comprising:
    electrically interconnecting a plurality of control points to one another and to a power source to collectively define a control point network,
    assigning a different identifying code to each of the control points, wherein each control point is operatively associated with at least a first utilitarian device,
    operatively connecting the plurality of control points to at least one control facility having a plurality of control members,
    designating at least a first of the control members to control a first predetermined number of control points,
    manipulating the plurality of control members in a predetermined sequence to establish the first predetermined number of control points,
    designating at least a second control member to control a second predetermined number of control points and manipulating the plurality of control members in the predetermined sequence to establish the second predetermined number of control points, and
    recognizing the identifying codes of the plurality of control points to prohibit inclusion of the first predetermined number of control points into the second predetermined number of control points.

2. A method as recited in claim 1 comprising recognizing the identifying code of any control point previously included in at least the first and, second predetermined number of control points to prohibit use thereof in a subsequent predetermined number of control points.

3. A method as recited in claim 2 comprising determining non-programmed control points by sequentially accessing the identifying code of each of the plurality of control points.

4. A method as recited in claim 3 comprising including a master control for storing the identifying codes of any programmed control point.

5. A method as recited in claim 1 comprising storing the identifying codes of any programmed control point in a master control assembly and determining non-programmed control points by sequentially reviewing the identifying code of each of the plurality of control points.

6. A method as recited in claim 5 comprising recognizing the identifying codes of any control point previously included in at least the first and second predetermined numbers of control points to prohibit use thereof in a subsequent predetermined number of control points.

7. A method as recited in claim 1 further comprising establishing a first programming mode corresponding to each of the first utilitarian devices operative at each of the plurality of control points.

8. A method as recited in claim 7 comprising defining each of the first utilitarian devices operative at each of the plurality of control points as an LED light assembly.

9. A method as recited in claim 7 comprising inputting the first programming mode by manipulating the plurality of control members.

10. A method as recited in claim 1 comprising operatively associating at least the first utilitarian device and a second utilitarian device with each of the plurality of control points and programming the first and second utilitarian devices for concurrent or independent operation.

11. A method as recited in claim 10 comprising defining each of the first utilitarian devices operative at each of the plurality of control points as an LED light assembly.

12. A method as recited in claim 11 comprising defining the second utilitarian device operative at each of the plurality of control points as a motion detector assembly.

13. A method as recited in claim 10 comprising defining the second utilitarian device operative at each of the plurality of control points as a motion detector assembly.

14. A method as recited in claim 10 further comprising establishing a first programming mode corresponding to each of the first utilitarian devices operative at each of the plurality of control points.

15. A method as recited in claim 14 further comprising establishing a first programming mode corresponding to each of the first utilitarian devices operative at each of the plurality of control points and establishing a second programming mode corresponding to each of the second utilitarian devices operative at each of the plurality of control points.

* * * * *